US010479216B2

(12) United States Patent
Clark et al.

(10) Patent No.: US 10,479,216 B2
(45) Date of Patent: *Nov. 19, 2019

(54) LINEAR MOTOR TRANSPORT FOR PACKAGING AND OTHER USES

(71) Applicant: MagneMotion, Inc., Devens, MA (US)

(72) Inventors: Tracy M. Clark, Devens, MA (US); Todd S. Webber, Boxborough, MA (US); Michael Bottasso, Maynard, MA (US); Robert Mosher, Weston, MA (US); Nathan King, Ayer, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,647

(22) Filed: Sep. 21, 2017

(65) Prior Publication Data

US 2018/0009332 A1    Jan. 11, 2018

Related U.S. Application Data

(62) Division of application No. 14/491,274, filed on Sep. 19, 2014, now Pat. No. 9,802,507.

(Continued)

(51) Int. Cl.
*B60L 13/03* (2006.01)
*B60L 13/00* (2006.01)
(Continued)

(52) U.S. Cl.
CPC ............. *B60L 13/03* (2013.01); *B60L 13/003* (2013.01); *B60L 13/10* (2013.01); *B60L 15/005* (2013.01); *Y02T 10/645* (2013.01)

(58) Field of Classification Search
CPC ......... B61B 13/00; B61B 13/03; B61B 13/10; E01B 25/34; B56G 35/06
See application file for complete search history.

(56) References Cited

U.S. PATENT DOCUMENTS 3,874,299 A * 4/1975 Silva ..................... B60L 13/003
                                                104/105
3,994,236 A * 11/1976 Dull ...................... B60L 13/003
                                                104/130.02

(Continued)

FOREIGN PATENT DOCUMENTS

JP    H2-35801 B2    8/1990
JP    H5-22807 A     1/1993

OTHER PUBLICATIONS

Extended European Search Report for application No. 14645259.2 dated Oct. 9, 2017, 7 pages.

(Continued)

*Primary Examiner* — Jason C Smith
(74) *Attorney, Agent, or Firm* — Fletcher Yoder, P.C.

(57) ABSTRACT

The invention provides in some aspects a transport system comprising a guideway having a plurality of regions in which one or more vehicles are propelled, where each such vehicle includes a magnet. Disposed along each region are a plurality of propulsion coils, each comprising one or more turns that are disposed about a common axis, such that the respective common axes of the plurality of coils in that region are (i) substantially aligned with one another, and (ii) orthogonal to a direction in which the vehicles are to be propelled in that region. The plurality of coils of at least one such region are disposed on opposing sides of the magnets of vehicles being propelled along that region so as to exert a propulsive force of substance on those magnets. In at least one other region, the plurality of coils disposed on only a single side of the magnets of vehicles being propelled in that region exert a propulsive force of substance thereon—regardless of whether the plurality of coils in that region are disposed on a single or multiple (e.g., opposing sides) of those magnets.

19 Claims, 8 Drawing Sheets

Related U.S. Application Data

(60) Provisional application No. 61/880,910, filed on Sep. 21, 2013.

(51) Int. Cl.
  B60L 13/10 (2006.01)
  B60L 15/00 (2006.01)

(56) References Cited

U.S. PATENT DOCUMENTS

| | | | |
|---|---|---|---|
| 5,904,101 A * | 5/1999 | Kuznetsov | B60L 13/10 104/130.02 |
| 8,502,422 B2 * | 8/2013 | Lykkegaard | H02K 41/031 198/805 |
| 2003/0217668 A1 * | 11/2003 | Fiske | B60L 13/04 104/282 |
| 2008/0148991 A1 * | 6/2008 | Wamble | B60L 13/04 104/282 |
| 2010/0186618 A1 * | 7/2010 | King | B60L 13/003 104/281 |
| 2010/0236445 A1 * | 9/2010 | King | B60L 13/003 104/130.03 |
| 2013/0074724 A1 * | 3/2013 | King | E01B 25/34 104/130.02 |
| 2015/0083018 A1 * | 3/2015 | Clark | B60L 13/003 104/282 |
| 2018/0009332 A1 * | 1/2018 | Clark | B60L 15/005 |

OTHER PUBLICATIONS

Final Decision of Rejection for JP 2016-515383 dated May 14, 2019, 10 pages.

\* cited by examiner

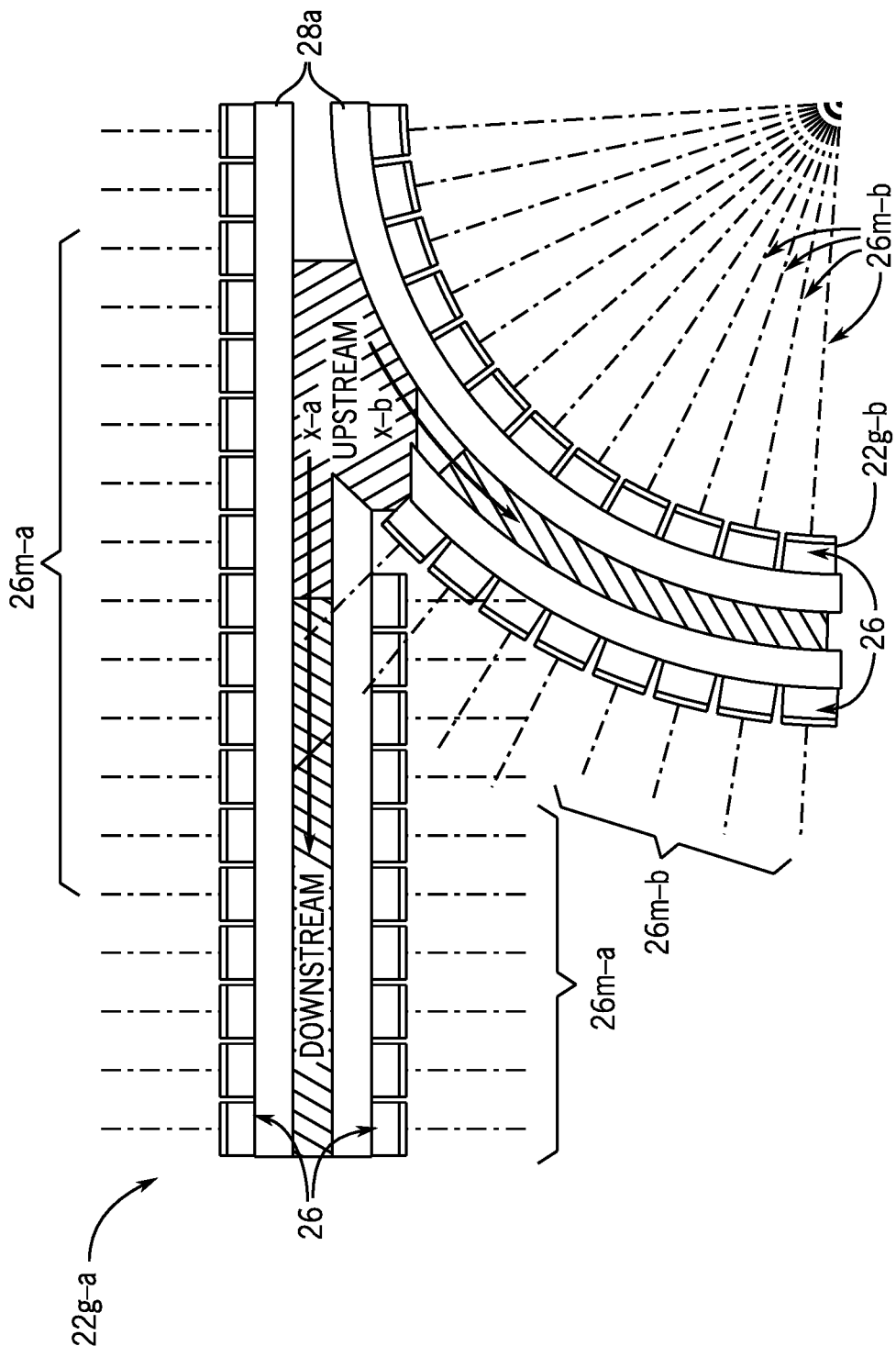

LINEAR MOTOR TRANSPORT FOR PACKAGING AND OTHER USES

CROSS-REFERENCE TO RELATED APPLICATIONS

This application is a divisional of and claims the benefit of U.S. patent application Ser. No. 14/491,274, filed Sep. 19, 2014, which claims benefit to U.S. Provisional Patent Application Ser. No. 61/880,910, filed Sep. 21, 2013, entitled "LINEAR MOTOR TRANSPORT FOR PACKAGING AND OTHER USES."

BACKGROUND OF THE INVENTION

The invention pertains to transport systems and more particularly, inter alia, to linear synchronous motor guideway-based transport systems. The invention has application, by way of non-limiting example, in packaging, assembly, production line, laboratory, printing, and other applications.

There are many types of transport systems that can move objects on a guideway. Examples include: wheel-suspended vehicles propelled by rotary or linear motors, maglev or air-cushion suspended vehicles propelled by linear motors or cables, vehicles that move in tubes propelled by air pressure, vehicles supported or guided by bearings, and vehicles that are moved on conveyor belts.

Existing transport systems have many useful applications but there are opportunities for substantial improvement, for example, in the precise movement of relatively small and closely spaced objects on a complex guideway.

Small and medium size objects are often transported on conveyor belts because this eliminates the need for wheels or other mechanisms to suspend, guide and propel the objects. Belt transport systems are relatively inexpensive but they lack precise control that is often needed and they require substantial maintenance because of many moving parts. Other approaches to low-cost transport include air propelled vehicles moving in tubes and the use of gravitational forces to move objects down an incline, but these approaches have even less precise control.

The advantages of using linear synchronous motor (LSM) propulsion are well known and described, by way of non-limiting example, in U.S. Pat. Nos. 7,458,454, 7,448,327, 6,983,701, 6,917,136, 6,781,524, 6,578,495, 6,499,701, 6,101,952, and 6,011,508, all assigned to the assignee hereof and the teachings of all of which are incorporated herein by reference.

Still, the applicant seeks to further improve transport systems, apparatus and methods that are based on LSMs. One object of the invention is to do just that.

Another related object of the invention is to provide such systems, apparatus and methods as are useful in packaging, assembly, production, laboratory, printing, and other applications.

A further related object of the invention is to provide such systems, apparatus and methods as are adapted for use with fast-moving and/or closely-spaced vehicles.

A still further related object of the invention is to provide such systems, apparatus and methods as can be easily assembled, reassembled, and reconfigured.

A yet still further related object of the invention is to provide such systems, apparatus and methods to facilitate complex packaging, assembly and other operations.

Yet a still further related object of invention is to provide such systems, apparatus and methods to provide for improved switching of vehicles and payloads that they carry.

Still yet a further related object of the invention is to provide such systems, apparatus and methods as provide for improved multi-level access to vehicles and payloads that they carry.

Still another object of the invention is to provide such systems, apparatus and methods which maximize throughput, yet, minimize "footprint."

SUMMARY OF THE INVENTION

The foregoing are among the objects attained by the invention, which provides in some aspects a transport system comprising a guideway having a plurality of regions in which one or more vehicles are propelled, where each such vehicle includes a magnet. Disposed along each region are a plurality of propulsion coils, each comprising one or more turns that are disposed about a common axis, such that the respective common axes of the plurality of coils in that region are (i) substantially aligned with one another, and (ii) orthogonal to a direction in which the vehicles are to be propelled in that region.

In related aspects, the invention provides a transport system, for example, as described above, in which the plurality of coils are disposed on only one side of the vehicles in at least one region of the guideway. An example of this might include individual branches of a merge/diverge region (alternatively referred to herein as a "diverge" region, or the like), where geometries and/or working requirements afford the opportunity of and/or necessitate such coil utilization along each individual branch of the diverge.

Still other related aspects of the invention provide transport systems, e.g., as described above, in which the vehicle magnets are disposed on only one side of their respective vehicles—e.g., the same side as that on which the coils are disposed.

In other related aspects of the invention, the coils are disposed on both, opposing sides of the vehicles in one or more such regions. An example of this might include a straight-away or inclined region, where geometries/requirements of the guideway afford the opportunity/necessitate such a configuration.

In other aspects of the invention, there is provided a transport system of the type described above in which, although coils are disposed on opposing sides of the vehicles propelled in that region, only the coils on one of those sides are "working" coils. This can be, for example, because only the coils on one side are activated or, for example, because only the coils on one side are close enough to the magnets of the vehicles to exert a propulsive force of substance thereon (e.g., a propulsive force that contributes measurably, if not also significantly, to movement of the vehicles along the guideway).

According to related aspects of the invention, the common axes of the plurality of coils in a region are aligned radially (e.g., as on a curved section of the guideway).

According to still other related aspects of the invention, at least one of the regions includes a back iron disposed adjacent to the plurality of coils, e.g., to focus the magnetic field on magnets of the vehicles being propelled therethrough.

According to still other aspects of the invention, the guideway is disposed to propel vehicles along one or more planes, including any of a horizontal plane (e.g., a tabletop configuration) and a vertical plane (e.g., an over-under configuration), and at multiple levels (e.g., floor height, bench height and/or overhead height).

According to yet other aspects of the invention, a guideway as described above includes a merge/diverge section (alternatively referred to herein as a "diverge" section, or the like) that includes a flipper, moving rails and/or other switching mechanism to facilitate redirection of a vehicle passing thereon.

According to yet other aspects of the invention, a guideway as described above includes one or more rails, guide surfaces or other means on which the vehicles travel. In related aspects, the vehicles include wheels, bearings or other means that cooperate with the rails and/or corresponding surfaces of the guideway.

Further aspects of the invention provide a transport system, e.g., as described above, where at least one of the regions is a merge/diverge (alternatively referred to herein as a "diverge," or the like) that any of (i) directs a vehicle from an upstream portion of the guideway to any of two or more branches in a downstream portion, and/or (ii) directs a vehicle from any of two or more branches in the downstream portion of the diverge to a common upstream portion of the diverge.

This can be, for example, any of a left-right, up-down or other diverge in a plane of motion defined by the diverge region. The diverge region may include a plurality of working coils that are disposed on only one side of the vehicles in the upstream portion and that apply lateral and propulsive forces effecting vehicle motion toward a selected one of the branches. The diverge region may also include a plurality of working coils on both, opposing sides of the vehicles in at least a downstream portion of the selected branch so as to facilitate propelling them, once they have been diverted to that branch.

Still other aspects of the invention provide vehicles and other apparatus for use on guideways as described above. Such vehicles can include, for example, magnet or magnet arrays that are centrally disposed on (or in) the vehicle body and that magnetically couple propulsion coils in the guideway. The vehicles can, further, engage running surfaces of the guideway on portions of the vehicle body distal with respect to those magnet or magnet arrays. According to related aspects of the invention, such engagement can be direct (e.g., body-to-running surface contact) and/or via wheels, bearings, slides, etc.

Still yet further aspects of the invention provide methods of operation of guideway systems, guideways and vehicles, e.g., as described above.

The foregoing and other aspects of the invention are evident in the drawings and in the text that follows.

BRIEF DESCRIPTION OF THE DRAWINGS

A more complete understanding of the invention may be attained by reference to the drawings, in which:

FIG. 5 depicts a merge/diverge module (alternatively referred to herein as a "diverge" module, or the like) of a guideway system according to the invention;

DETAILED DESCRIPTION OF THE ILLUSTRATED EMBODIMENT

Overview

Figure 1:
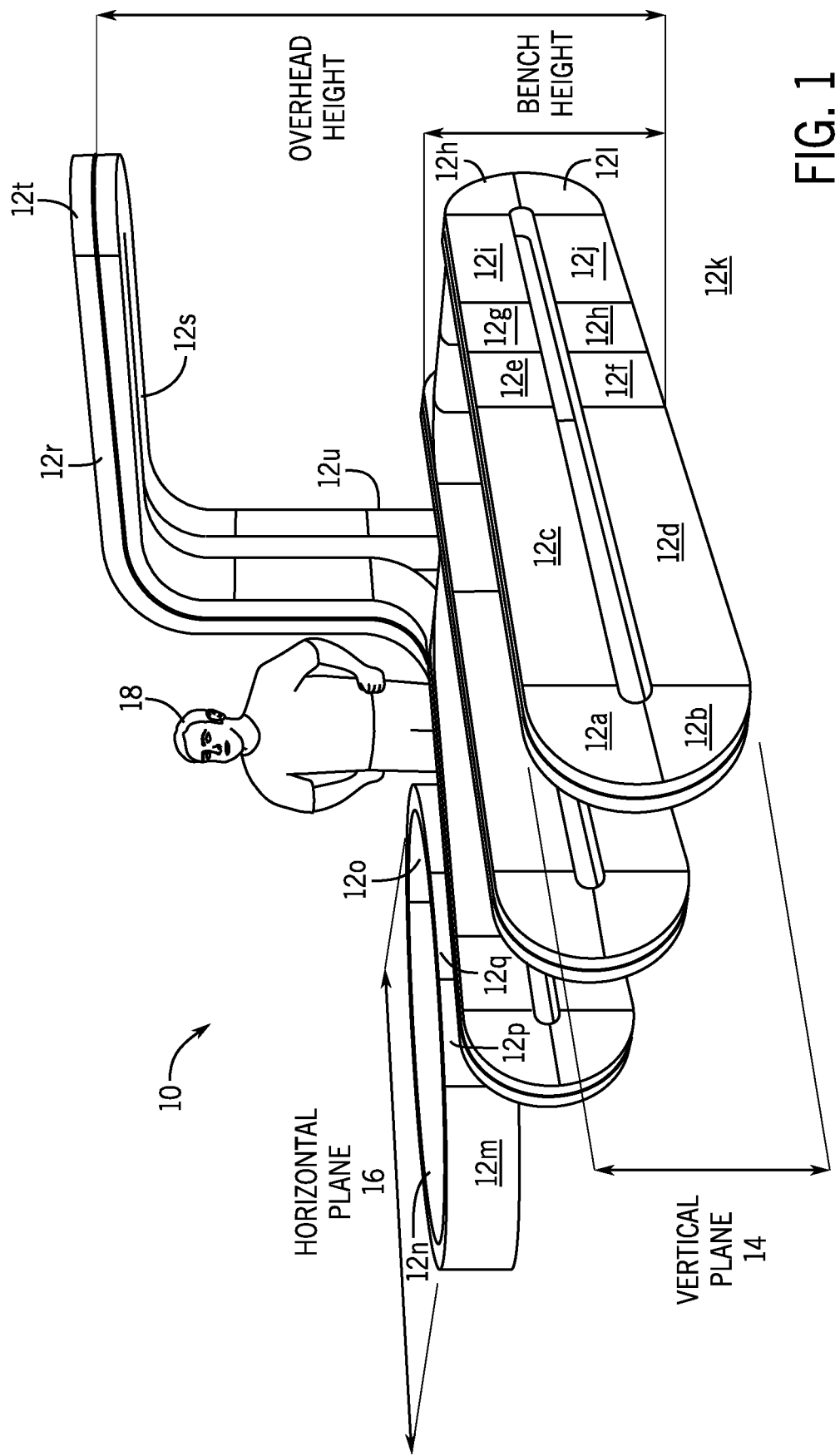
FIG. 1 depicts a guideway system according to one practice of the invention.

FIG. 1 depicts a linear synchronous motor (LSM) guideway 10 for transporting vehicles according to one practice of the invention. The guideway 10 includes a plurality of modules, each delineated in part by dashed lines in the drawing. Exemplary ones of the modules are labelled as elements 12a, 12b, 12c, ... 12t, respectively, although more than that number of modules are shown. Other embodiments may contain a greater or fewer number of modules configured in the manner of the illustrated guideway 10 or otherwise. Indeed, in some embodiments, an entire guideway may be embodied in a single module.

The modules 12a-12t, which typically each include at least one running surface for a vehicle 24 (FIG. 2), and, in some instances, multiple such surfaces, are coupled with one another to form a pathway suitable for propelling vehicles 24. Those running surfaces and, more generally the modules, are arranged to form regions that include straightaways, curves, inclines, and so forth. Each such region can comprise a single module or multiple modules, depending on implementation specifics.

Those regions, moreover, may define one or more planes of motion in which the vehicles 24 are propelled. This can include module(s) whose running surfaces define, by way of non-limiting example, a vertical plane of motion as exemplified by modules 12a-12L, the running surfaces of which define a path on vertically disposed plane 14. This can also include, by way of further non-limiting example, a horizontal plane of motion as exemplified by modules 12m-12q, the running surfaces of which define a path on horizontally disposed plane 16. Modules 12r-12t define another such horizontal plane of motion—though, vehicles 24 disposed on a path defined by them move transversely vis-à-vis those moving on the path defined by modules 12m-12q. Other planes of motion along which vehicles 24 traveling on guideway system 10 may be propelled are evident upon study of FIG. 1. Still others may be formed in other embodiments constructed in accord with the teachings hereof.

The modules 12a-12t may, moreover, be configured for conveying vehicles 24 traveling on system 10 at different heights or levels. This can include, by way of non-limiting example, conveying vehicles 24 at tabletop height as exemplified by modules 12m-12o, and modules 12c, 12e, 12g, and 12i, among others, the running surfaces of which define paths of motion for vehicles 24 traveling thereon at a tabletop height vis-à-vis an operator 18. This can also include, by way of further non-limiting example, conveying the vehicles 24 at overhead heights as exemplified by modules 12r-12t, the running surfaces of which define paths of motion for vehicles 24 traveling thereon at an overhead height vis-à-vis operator 18. As will be appreciated from FIG. 1, the modules of guideway 10 can convey vehicles 24 at other heights, such as for example floor-height, instead and in addition.

Figure 2:
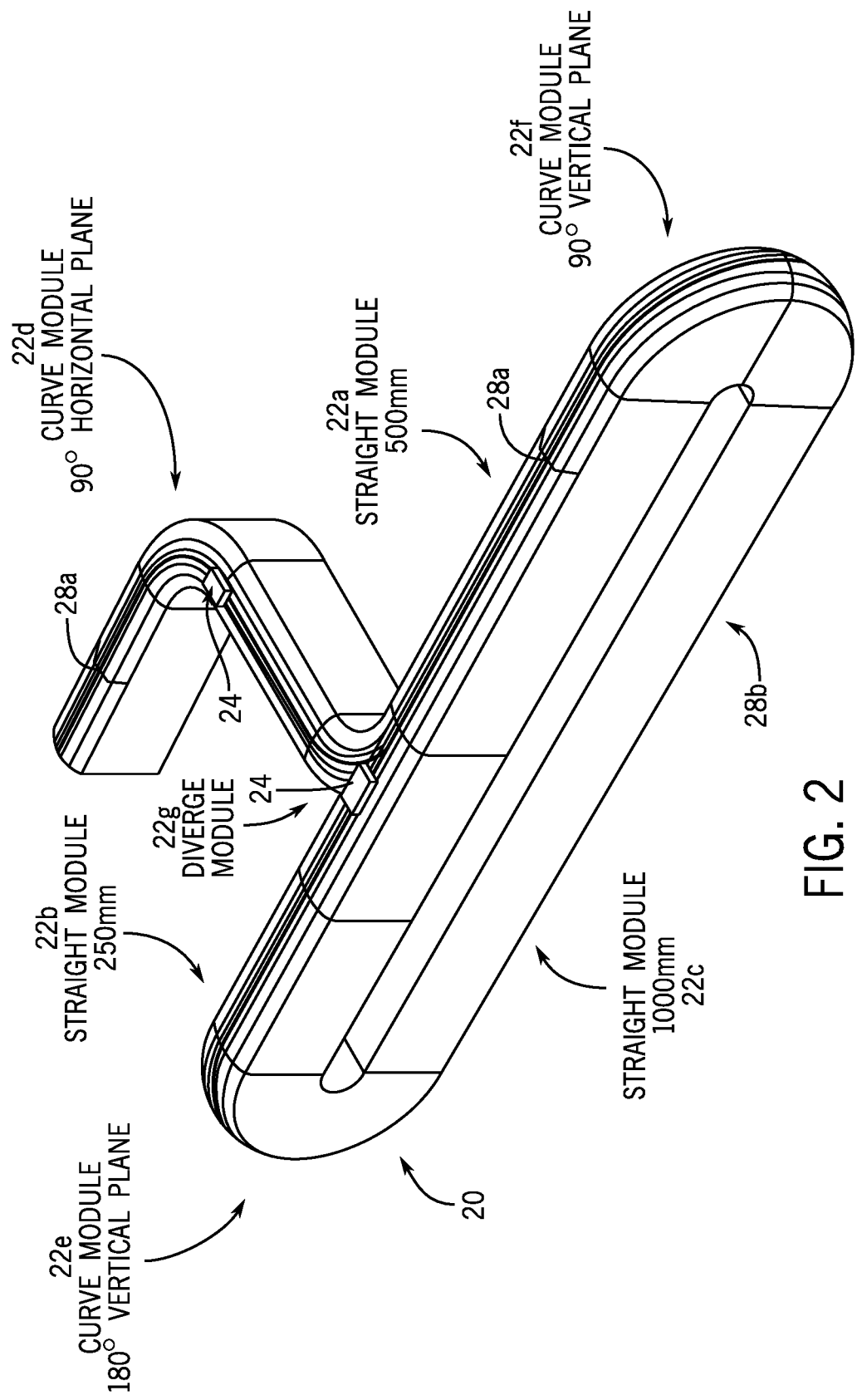
FIG. 2 depicts a portion of a guideway system according to a further practice of the invention.

FIG. 2 depicts a portion of an LSM guideway 20 similar to, but defining a different pathway than, guideway 10. As above, guideway 20 comprises modules whose running surfaces define regions in which vehicles 24 are propelled along pathways in the same and/or different planes of motion and heights, and so forth. The illustrated modules of FIG. 2 are similar in construction and operation to modules 12 of guideway system 10 (of FIG. 1), though, here (in FIG. 2) they are labeled differently, i.e., as elements 22a-22g, and they are arranged in a different configuration and, thereby, define a different pathway. To that end, it will be appreciated that one or more of the modules 22a-22g of the portion 20 of FIG. 2 can be substituted into the guideway system 10 of FIG. 1 and vice versa.

As shown in FIG. 2, a guideway according to the invention can include, by way of example, modules 22a-22c that define straight-away paths, e.g., of varying lengths (here, 250 mm, 500 mm and 1000 mm, by way of non-limiting example), for vehicle motion.

Such a guideway can also include modules for use in defining curved paths of motion, e.g., as shown here with module 22d defining a curved path in a horizontal plane of motion, as well as modules 22e, 22f for use in regions defining curved paths in vertical planes of motion. The degree of curvature of modules 22d-22f may vary depending on the specifics of implementation. Thus, for example, both 90-degree and 180-degree curves are shown in the drawing; other embodiments may utilizes modules with other degrees of curvature, instead or in addition. It will also be appreciated that the radii of the curves need not be the same for all (curved) regions and that the radius of a curve may even change within a given region.

The modules of a guideway according to the invention can also include merge/diverge modules, for example, of the type labelled as 22g in the drawing. These can be left-right merge/diverge modules that direct vehicles in a horizontal plane of motion, up-down merge/diverge modules that direct vehicles in vertical planes of motion, and so forth, depending on the pathway options defined by a particular guideway. And, although some guideways according to the invention can include merge/diverge modules that direct vehicles in a single, common plane of motion (e.g., horizontal or vertical or so forth), other guideways according to the invention include merge/diverge modules that direct vehicles in multiple respective planes of motion—e.g., one or more modules for horizontal planes of motion, one or more modules for vertical planes of motion, and so forth).

The foregoing and other modules are shown in FIG. 1, e.g., inclined curve module 12u. It will be appreciated, of course, that the straight-away, curve, merge-diverge and other modules shown in FIGS. 1-2 are merely examples and that other embodiments may utilize modules incorporating different shapes.

Vehicles

Vehicles 24 of the illustrated embodiment may be constructed in the manner of LSM vehicles known in the art—as adapted in accord with the teachings hereof—and, more particularly, for example, in the manner of the vehicles described and shown in International Application Publication No. WO2014047104 and U.S. Patent Publication 2013/0074724, the teachings of both of which are incorporated by reference herein, including by way of non-limiting example, in the manner of the vehicles disclosed in FIGS. 2-5, 15-17, 23A through 26B of those publications—again, as adapted in accord with the teachings hereof.

FIGS. 3A and 6-8 depict the central bodies (or frames) of vehicles 24 according to practices of the invention. Like reference numbers in those drawings identify like components of the frames and vehicles and guideway systems in which they are incorporated. As will be evident in those drawings and in the discussion that follows, those vehicles generally (a) include magnet or magnet arrays that are centrally disposed on (or in) the vehicle body and that magnetically couple propulsion coils in the guideway modules, and (b) engage running surfaces of the guideway on portions of the vehicle body distal with respect to those magnet or magnet arrays. Such engagement can be direct (e.g., body-to-running surface contact) and/or via wheels, bearings, slides, etc.

Figure 3A:
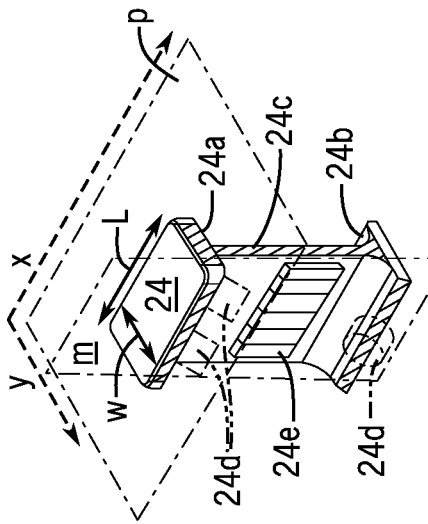
FIG. 3A depicts a vehicle of the type used in practice of the invention.

More particularly, by way of example, FIG. 3A depicts the frame of vehicle 24 according to one practice of the invention and of the type suitable for use with guideways 10, 20. That frame is a generally rigid structure having the cross-section of an I-beam or H-beam (or, in some instances, a T-beam). Thus, the frame has a generally planar central portion 24c or "web" (using the terminology associated with I- and H-beams) of generally rectangular cross-section, the distal ends of which web terminate in distal end portions 24a, 24b or "flanges" (again, using beam terminology) that, too, can be of generally rectangular cross-section or otherwise, as shown. Like the serifs of the letters "I" or "H" whose cross-sections the frame approximates, the flanges at ends 24a, 24b can be centered on their respective ends of the web 24c and at right angles to it, though other embodiments may vary in these regards (e.g., off-centered flanges, angled flanges or otherwise).

Figure 6B:
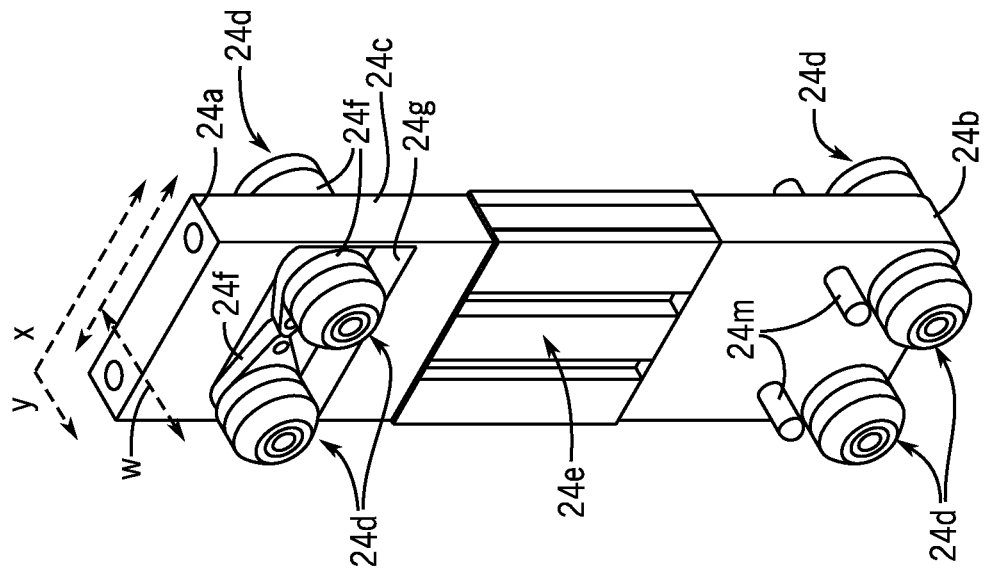
FIGS. 6A and 6B are perspective views of vehicles of the type used in practice of the invention.
Figure 6A:
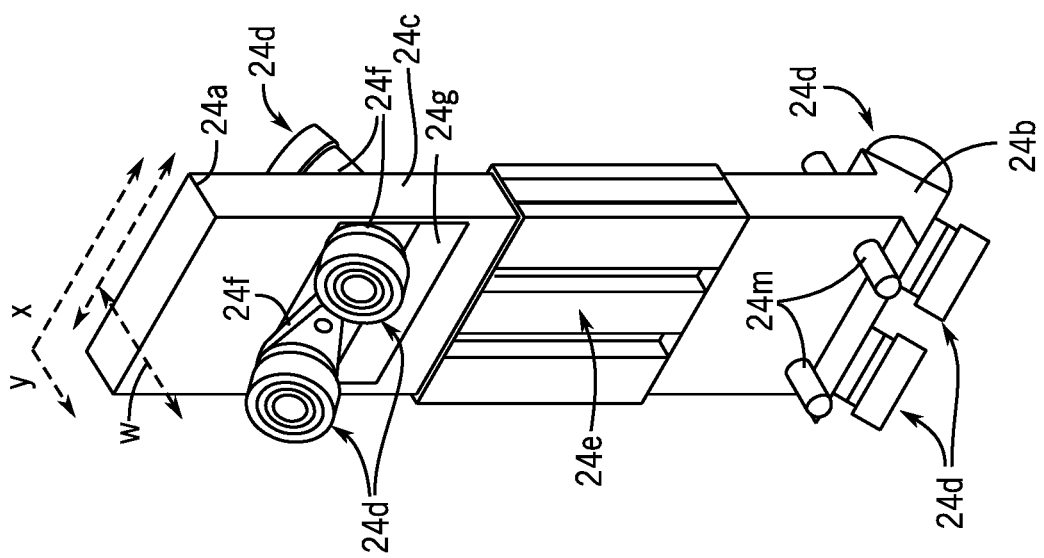
Figure 8:
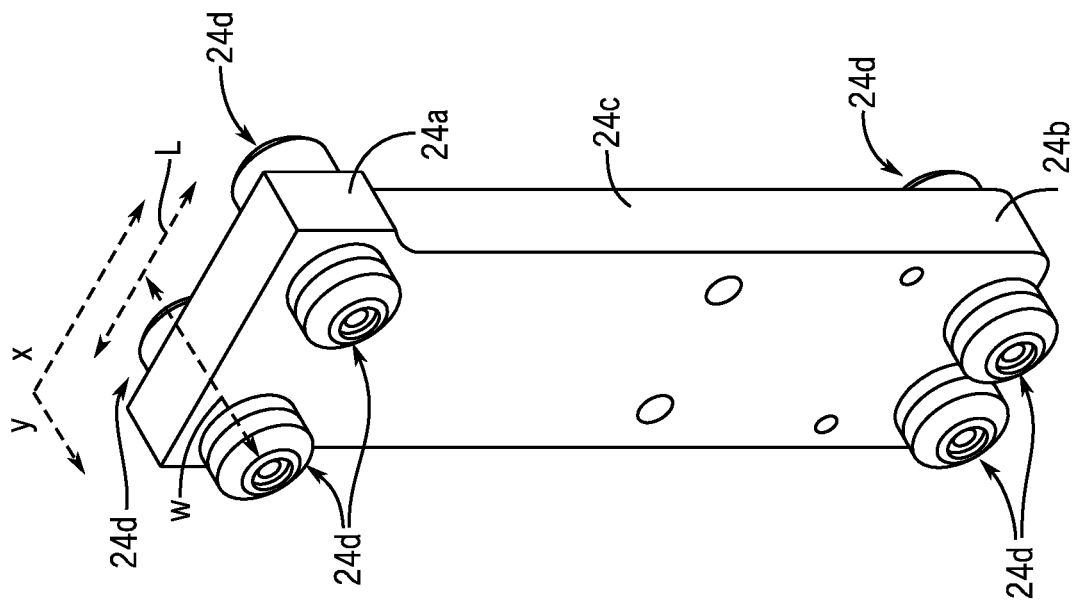
FIGS. 7 and 8 are perspective views of still other vehicles of the type used in practice of the invention.
Figure 7:
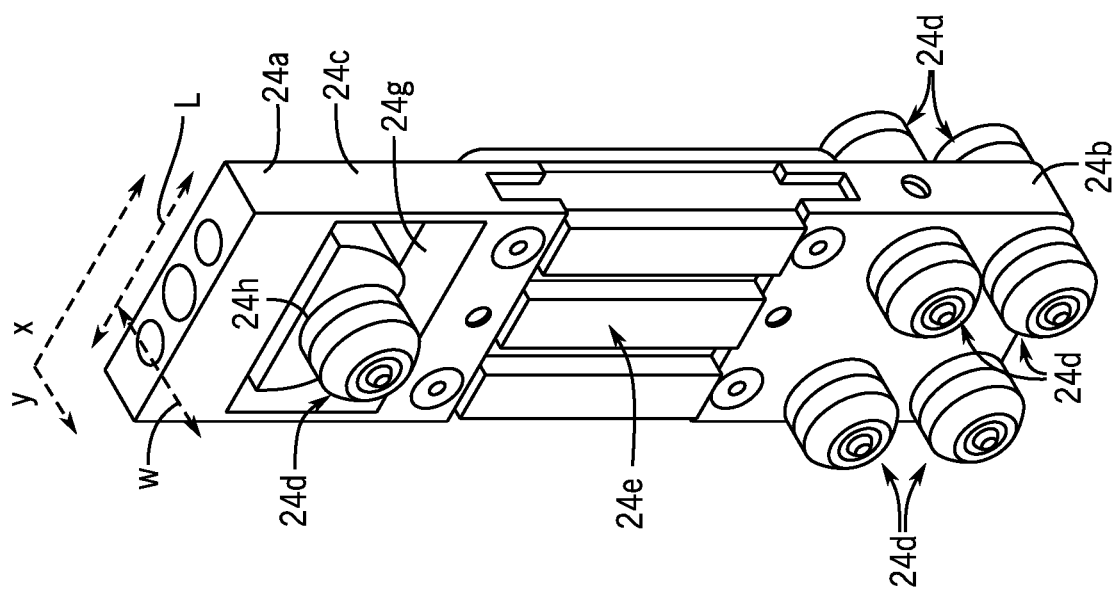

FIGS. 6-8 illustrate, also by way of example, frames utilized in a vehicle 24 according to other practices of the invention. Those alternate frames are generally planar, but they lack flanges of the type described above at both of the end portions 24a, 24b (although, the embodiment of FIG. 6A includes an "inverted" flange—here, shaped like an arrowhead—at distal end 24b). A generally rectangular cross-section is not a requirement of frames of vehicles used with guideways 10, 20, as evidenced by way of example by the frame shown in FIG. 8, which has an enlarged cross-section at end 24a, e.g., for added stability depending on payload requirements, guideway configuration and/or vehicle velocity profiles on that guideway.

Although in some embodiments, the vehicle 24 slides directly on running surfaces of the modules 12a, et seq., and 22a, et seq., in the illustrated embodiments, it includes wheels, bearings, skids or other componentry to facilitate movement of the vehicle along the guideway defined by the running surfaces of those modules (here, wheels 24d demarked by dashed lines in FIG. 3A and in solid lines in the other drawings). Those wheels, bearings, skids, or other movement-facilitating componentry (hereinafter, collectively, "wheels," for sake of convenience and without loss of generality) may extend from the flanges at ends 24a, 24b, e.g., as illustrated in FIG. 3A, or otherwise. Though the examples discussed below and shown in the drawing are wheels, per se, it will be appreciated that the teachings are equally applicable to bearings, skids, or other movement-facilitating componentry of the vehicle 24.

Thus, for example, the wheels may extend from an inverted flange, e.g., as shown in FIG. 6A, or directly from the web 24c or other portion(s) of the frame, vehicle 24 or mounting mechanisms associated therewith. By way of example are wheels mounted on pivoting members 24f in the recess 24g of the vehicle frame, e.g., as shown in FIGS. 6A, 6B; wheel(s) mounted on sliding member 24h in such recess, e.g., as shown in FIG. 7; and, wheels mounted directly on planar portion of frame, e.g., as shown in FIGS. 6B, 7 and 8.

Referring to FIGS. 6-8, mounting mechanisms such as, for example, illustrated pivots 24*f* and slides 24*h* can be employed to facilitate mounting/dismounting the vehicle 24 to/from guideway 10, 20, to facilitate loading/unloading of the vehicle, to facilitate vehicle motion over the guideway, or otherwise. Further details of those mechanisms are illustrated in FIG. 9.

Figure 9B:
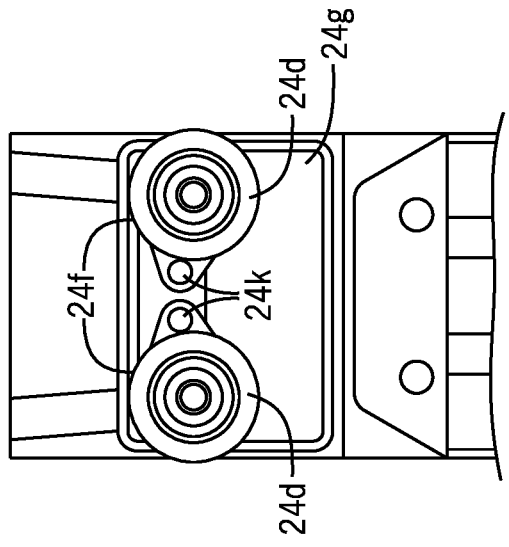
FIGS. 9A-9D are perspective, see-through views of wheel mounts used in vehicles according to some practices of the invention.
Figure 9D:
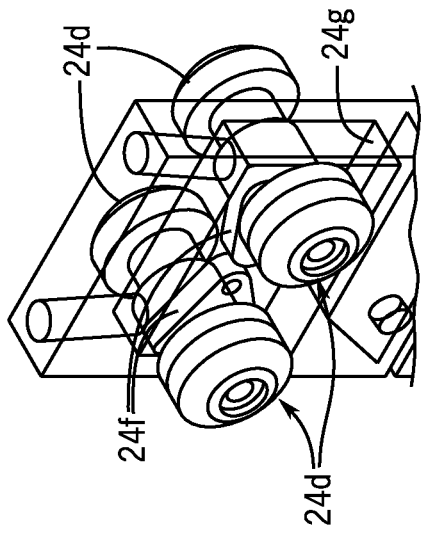
Figure 9A:
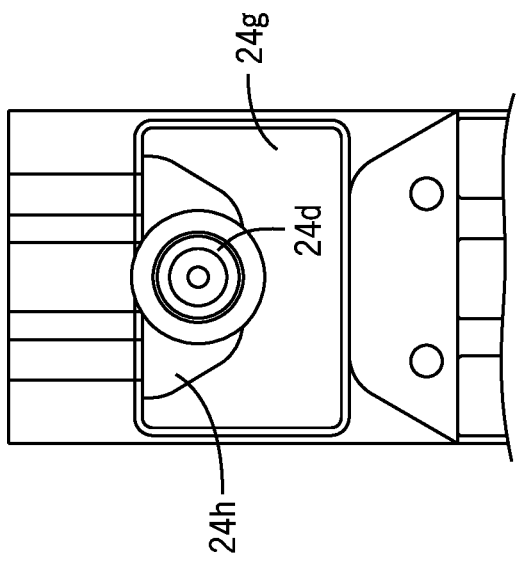
Figure 9C:
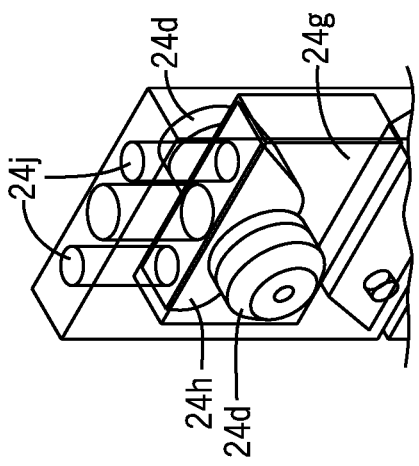

Referring to FIGS. 9A, 9B, for example, there are shown, respectively, front and perspective see-through views of sliding member 24*h*, which includes a body portion (to which the wheel 24*d* is mounted) and pin portions extending therefrom which are slidingly disposed in channels 24*j* of the frame, as shown. Likewise, referring to FIGS. 9C, 9D, for example, there are shown, respectively, front and perspective see-through views of pivoting member 24*f*, which includes a body portion (to which the wheel 24*d* is mounted) that pivots about an axle or pin 24*k*, as shown. The sliding member 24*h* and pivoting member 24*f* can be biased, via a spring or otherwise, to appropriately suspend (or otherwise position) the vehicle 24 in its respective loaded, unloaded, and other modes, on the guideway.

Wheels 24*d* may be arranged on the vehicle frames in a variety of ways. For example, one or more wheels may extend from each frame in symmetrical fashion. Or, by way of further example, referring to FIG. 3A, a pair of wheels may be centered on and extend from one flange (e.g., at end portion 24*a*), while only a single wheel extends from the other flange (at end portion 24*b*). (Only one side of the vehicle 24 frame is shown in that drawing; a similar arrangement of wheels may be provided on the other side.) FIGS. 6-8 shows still other arrangements of wheels, all by way of example. Specifics of the arrangement utilized for any given embodiment are a function of vehicle load type, load "footprint," and load balance, vehicle velocity profile, and so forth.

Figure 3C:
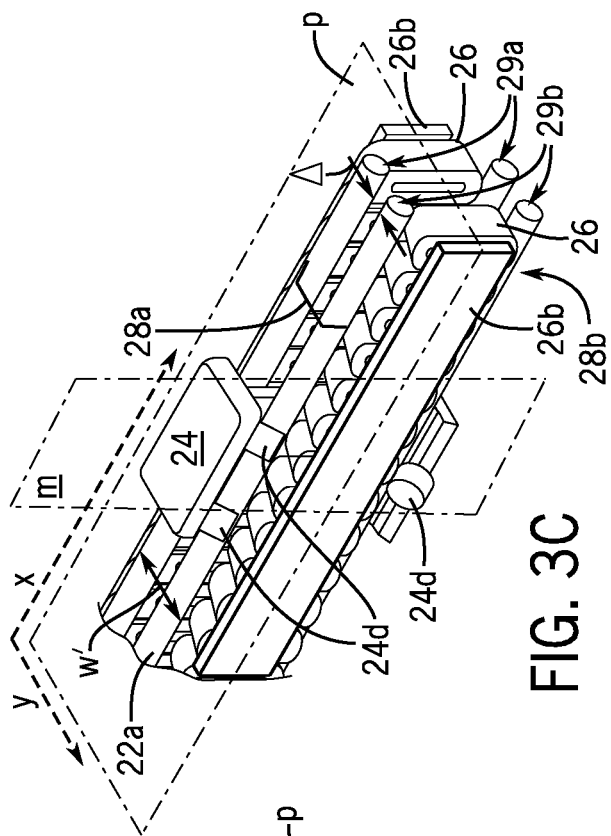
FIGS. 3B-3C are cut-away views of varying embodiments of a straight-away module of the type shown in the guideway system of FIG. 2.
Figure 3B:
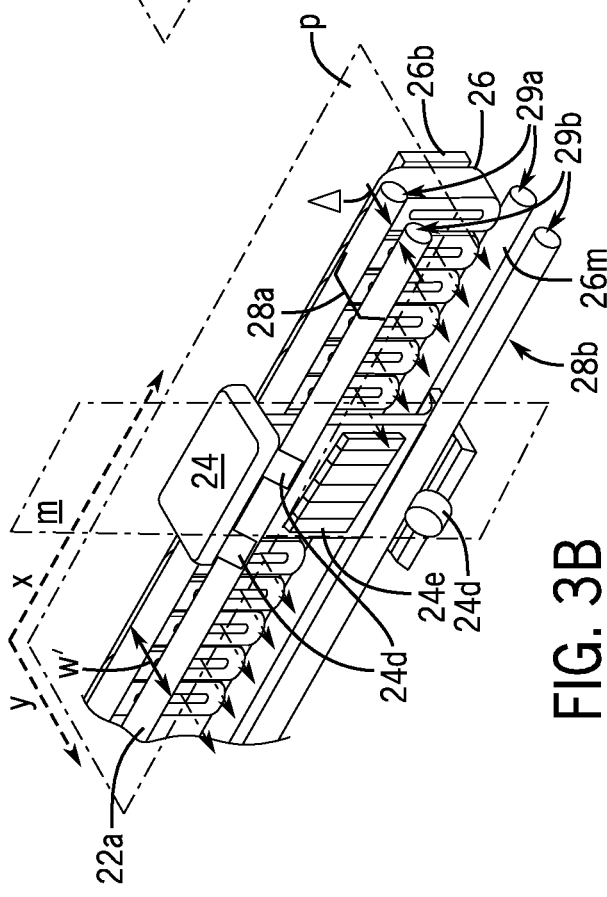

Wheels 24*d* may extend normally (i.e., at substantially a 90° angle) from the surface of the flange, frame or component of vehicle 24 to which they are mounted. Conversely, they may extend at an angle from that surface, e.g., as shown in FIGS. 3A-3C and 6A, all by way of example. Still further, such wheels may have a cupped surface (e.g., as shown in FIGS. 3A-3C), flat surface (e.g., as shown in FIG. 6A) or chamfered surface (e.g., as shown in FIGS. 6B and 7-9).

As examples of slides or bearings that may be used to facilitate vehicle movement are pins 24*m* shown in FIGS. 6A, 6B. These can be utilized, for example, where vehicle-to-guideway contact is less regular, e.g., during loading/unloading, vehicle movement over guideway transitions, etc., or otherwise.

Referring to FIGS. 6-8, the frame of illustrated vehicle 24 extends (here, by a length L) along an axis x running parallel to the running surfaces (or pathway) defined by module 22. Taking into account the span of wheels, bearings, skids or other componentry discussed above, the end portions 24*a*, 24*b* of the vehicle 24 have a width w along an axis y (transverse to the x axis) that approximates the width w' of the guideway defined by the running surfaces 28*a*, 28*b* of module 22, thereby, allowing the frame to be supported and/or its motion to be constrained/guided by those surfaces 28*a*, 28*b*, though other embodiments may vary in this regard.

In typical embodiments, magnets 24*e* are disposed on each side of web 24*c*, though, in some embodiments, they may be disposed on only one side—e.g., the side on which the working propulsion coils 26 are disposed (as discussed below in connection with FIGS. 3B and 3C). The magnets may be of the type and configuration commonly used in LSM applications. Thus, for example, the magnets on each side of the web 24*c* may be configured in an array, e.g., such as a Halbach array or, for example, an array with one middle magnet that has a South pole facing away from the web and two half magnets on the ends that have a North pole facing in that same direction, though a single magnet or other configurations of multiple magnets may be employed. The magnets may comprise NdFeB in order to achieve high fields, but they can use other materials, such as ceramic, when cost or external fields must be low or Samarium Cobalt when the operating temperature is high. In embodiments where there is risk of adverse interaction between magnets on adjacent vehicles 24, a ferromagnetic piece can be placed around the perimeter of the magnet(s) (array) to minimize magnetic fields from adjacent vehicles from interfering with each other. Though, for sake of simplicity and without loss of generality, the magnets 24*e* of the illustrated embodiment are shown as being distinct from the web 24*c* on which they are disposed, it will be appreciated that the magnets 24*e* may be integral to the web 24*c*, e.g., as shown in FIGS. 6-8.

In some embodiments, vehicles 24 may constitute little more than a frame, magnet and, optionally, wheels, bearings, or skids, etc. In those embodiments, payloads (not shown) can be placed on, affixed to or otherwise coupled to those frames (and/or to the magnet or other components). In other embodiments, the vehicles 24 may include housings, jigs or other apparatus (not shown) that are attached to one or both of the flanges 24*a*, 24*b* or other components, e.g., in order to facilitate carrying of such payloads.

Modules

The guideways 10, 20 may be constructed in the manner of LSM guideways known in the art—as adapted in accord with the teachings hereof—and, preferably, for example, in the manner of the guideway described and shown in International Application Publication No. WO2014047104 and U.S. Patent Publication 2013/0074724, the teachings of both of which are incorporated by reference herein—again, as adapted in accord with the teachings hereof. Particular reference is had in this regard, by way of example, to the sections of the aforesaid incorporated-by-reference applications entitled "Guideway," "Low friction sliding surface," "Magnet array," and "Linear propulsion motor," as well as to the figures referred to in those sections, all by way of example. The guideways 10, 20 may be of unitary construction, though, preferably, they are fabricated from modules, for example, of the type described in the aforesaid incorporated-by-reference applications in the sections entitled "Guideway modules" and in the figures referred to in that section—again, as adapted in accord with the teachings hereof.

More particularly, the construction of the modules of guideways 10, 20 of the illustrated embodiment is depicted in FIGS. 3B-3C. The former (FIG. 3B) is a cut-away view of a module having propulsion coils 26 disposed on only one side of magnets of vehicles 24 propelled in the region defined by that module; the latter (FIG. 3C), both sides. Although straight-away module 22*a* is provided here as the example, it will be appreciated that the other modules of the guideways according to the invention may be similarly constructed, though, their respective shapes and the pathways that they define may vary.

Referring to FIG. 3B, the module 22*a*, like the other modules of guideways 10, 20, can have several components: running surfaces 28*a*-28*b*, propulsion coils 26 comprising an LSM motor and, optionally (but typically) position sensing logic, power electronic components, and/or microprocessors that serve as controllers for the module or for "blocks" defined within and/or by one or more modules. All of these components can be contained in a common housing (e.g., element 40 of FIG. 4) or otherwise assembled together on-site, at the factory, or otherwise, in the conventional manner known in the art, (e.g., as described in U.S. Pat. No. 6,578,495, entitled "Modular Linear Motor Tracks And Methods of Fabricating Same," assigned to the assignee hereof, the teachings of which are incorporated herein by reference, as adapted in accord with the teachings hereof.

Illustrated module 22a has multiple running surfaces on which vehicles 24 are propelled. Those surfaces can serve, for example, to carry the weights of those vehicles and/or to guide them as they pass along the module.

In the illustrated embodiment, the running surfaces 28a, 28b are defined by opposing rail pairs 29a, 29b, as shown, and, more particularly, in this drawing, by right-side rail pair 29a and left-side rail pair 29b, that are spaced-apart by a gap Δ. That gap Δ is sufficient to permit at least web 24c (and, as necessary, magnet array 24e and other structures on web 24c) to pass between the rails 29a, 29b, while the end portions 24a, 24b of vehicle 24 and/or wheels, slides, bearing or other structures thereon move on those rails. Of course, it will be appreciated that the designations "right" and "left," here, are a function of the orientation of the module 22a in the illustration, and that in other embodiments that incorporate such opposing rail pairs, they may comprise a top-side pair and a bottom-side pair or some other orientation of opposing rail pairs.

Illustrated rail pairs 29a, 29b each comprise two rails of generally round (here, circular) cross-section along which pass wheels or other componentry of the vehicles that facilitate such movement (as noted above). Of course one or both of the two rails (of each respective pair 29a, 29b) can be of other shapes and, more specifically, for example, of different cross-sections, both from each other and/or from that shown in the drawing. Thus, for example, one or both rails of each pair can be grooved (e.g., to accommodate bearings on the vehicles in lieu of the wheels shown here), flat (e.g., to accommodate skids), and so forth—all by way of example.

And, although each running surface of illustrated module 22a is defined by an opposing pair of rails, in other embodiments, it may comprise a greater or fewer number of rails or other structures. For example, each running surface may be defined by only a single rail. Indeed a running surface need not comprise any or only rails: it can comprise one or more low friction sliding surfaces (e.g., of the type disclosed in incorporated-by-reference International Application Publication No. WO2014047104 and U.S. Patent Publication 2013/0074724, for example, in the section entitled "Low-Friction Sliding Surface" and the accompanying drawings, as adapted in accord with the teachings hereof), grooves, and so forth, all as adapted in accord with the teachings hereof. For example, in some embodiments, a module includes one or more running surfaces, each defined by such a low friction sliding surface, albeit one that includes a slot which runs along that surface in the direction of motion of the vehicles and which accommodates the web 24c of each respective vehicle just as opposing rails of the pairs of rails 29a, 29b accommodate that web 24c.

Modules, e.g., 22a, having an arrangement of running surfaces and propulsion coils 26, e.g., as shown here (with respect to a straight-away) and discussed elsewhere herein, can (also) be advantageous, among other places, in diverge regions of the type shown, for example, in FIG. 5, where geometries and velocity constraints may dictate that and/or afford the opportunity to (a) dispose working coils on only one side of the upstream portion of each branch of a diverge region, yet, (b) dispose working coils on both sides of the downstream portions of both branches—all as shown, by way of nonlimiting example, in the diverge module of FIG. 5.

Propulsion coils 26 are of a type conventionally used in LSMs, as adapted in accord with the teachings hereof, each comprising one or more turns that are disposed about a common axis (that is, an axis common to the turns of that respective coil). In the illustrated embodiment, the coils 26 are "working coils," that is, coils that are disposed close enough to the vehicle magnets 24e and powerful enough when activated to exert a propulsive force of substance thereon (as opposed to, for example, merely a lateral or steering force) in order to propel the vehicles 24 along the guideway, here, in the direction of the x axis. In order to focus their magnetic fields, the propulsion coils 26 can include back irons 26b of the type known in the art and, additionally, each can include a core (not shown).

In diverge regions, e.g., of the type shown in FIG. 5, working coils 26 in the upstream portion of each branch of the diverge can be disposed in sufficient proximity of the vehicle magnets 26 such that, when the coils on a single side of the vehicle 24 are activated, those coils exert sufficient force to propel the vehicle into and through the diverge branch while, optionally serving (instead or in addition to flippers, moving rails and/or other switching mechanisms) to diverting the vehicle 24 toward a specific one of the branches.

Although discussed above and elsewhere herein are configurations in which propulsion coils are disposed on only one side of the guideway in one or more regions thereof, it will be appreciated in some embodiments, coils may be placed on both sides but activated (i.e., "working," as defined above), on only one side in one or more such regions.

Figure 4:
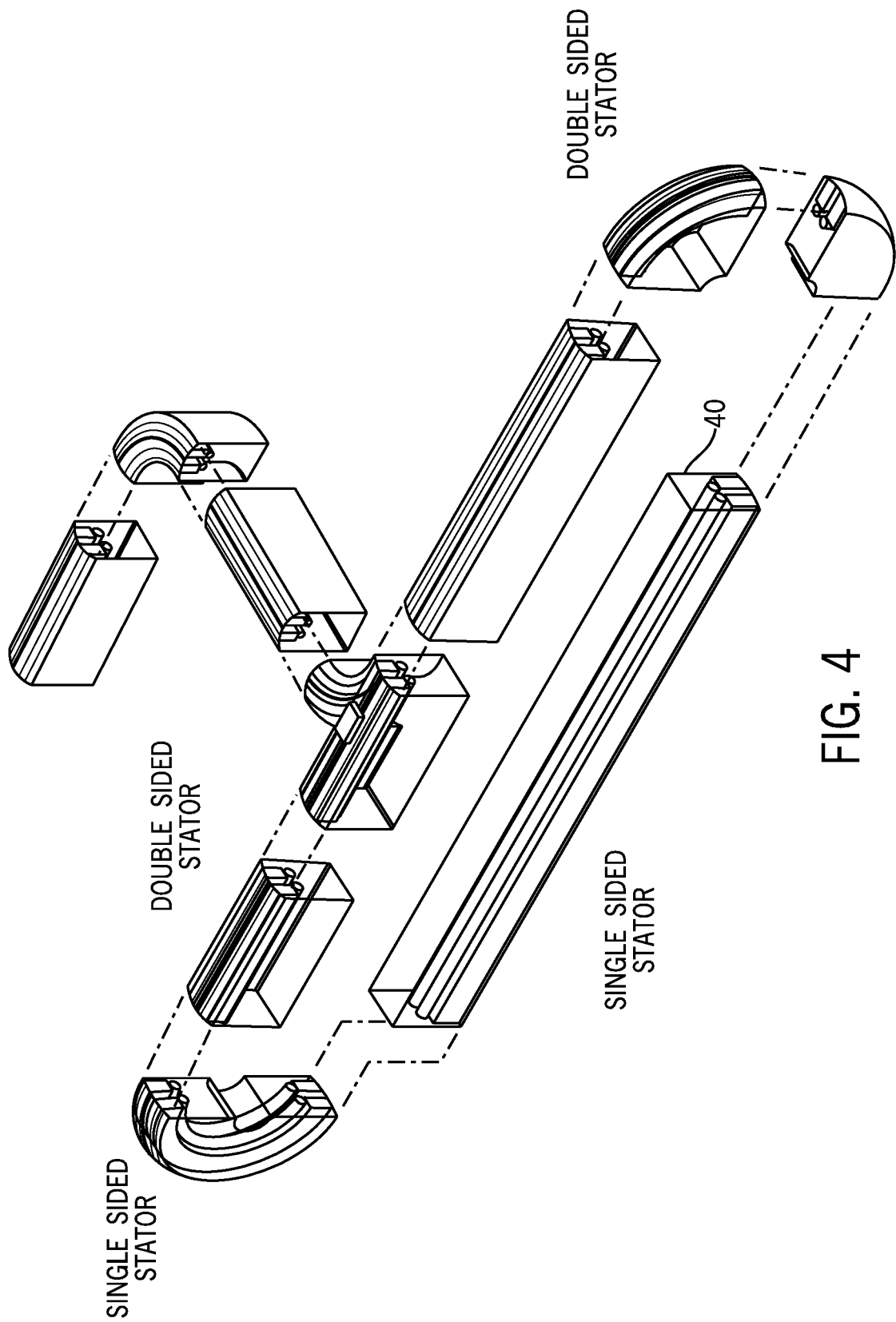
FIG. 4 is a cutaway, exploded view of the guideway system shown in FIG. 2.

Comparing FIGS. 3B and 3C, in the former (FIG. 3B) working propulsion coils 26 are disposed on only one side of the guideway and, more particularly, on one side of module 22a and, still more particularly, on one side of the web 24c and magnets 24e of vehicles 24 propelled on that module 22a; while, in FIG. 3C, working propulsion coils 26 are disposed on both sides of the guideway and, more particularly, both sides of module 22a and, still more particularly, on both sides of the web 24c and magnets 24e of vehicles 24 propelled on that module 22a. A guideway can comprise modules with working propulsion coils on one side, on both sides, or a combination thereof, as shown in FIG. 4. Indeed, a given module may have working coils 26 on one side over part of the guideway pathway it defines and on two sides on the rest of that pathway.

Inclusion of working propulsion coils on one side or both sides of the guideway can be necessitated by geometries and/or working requirements of the guideway. This is by way of example, only, since other factors, e.g., such as cost, availability, assembly constraints, etc., can determine where and whether there is the opportunity or necessity for coils on one side, the other side or both.

For example, working coils can be disposed on both, opposing sides of an incline or other region where vehicle loads necessitate that greater cumulative propulsive forces be exerted on the vehicles in order to propel them along the guideway with suitable acceleration (or deceleration); or, conversely, that working coils only need by disposed on one side in straight-away regions where unloaded vehicles need be propelled with little or no acceleration/deceleration.

Likewise, geometries and velocity constraints may dictate that and/or afford the opportunity to (a) dispose working coils on only one side of the upstream portion of each branch of a diverge region, yet, (b) dispose working coils on both sides of the downstream portions of one or both branches—all as shown, by way of nonlimiting example, in the diverge module of FIG. 5. By placing or activating coils on only one side of the upstream portion of each branch, lateral forces applied by those (working) coils can—in lieu or along with lateral forces exerted by a flipper or other switching mechanism—direct a vehicle 24 moving through that portion to a selected one of the branches and, when the vehicle 24 enters that branch, it can be (more forcefully) propelled by coils on both sides.

In modules 12a, et seq., and 22a, et seq.—and, more generally, regions of a guideway 10, 20—in which coils 26 are disposed on opposing sides of the magnets of the vehicles 24, both sets of coils can be working (as defined above) at the same time, though, they need not be. This can be, for example, because only the coils on one side are "working" coils or, for example, in the case of a diverge region of the guideway, because only the coils on one side are close enough to the magnets of the vehicles to exert a propulsive force of substance thereon.

Referring back to FIGS. 3B-3C, the portion of each running surface, e.g., 28a, 28b, within each straightaway, curve, or other region defined by the module 22a defines a plane p that includes the x-axis (i.e., the axis defining the direction in which the vehicle 24 is propelled in that region) or a parallel axis thereto, and is orthogonal to a plane m defined by and/or parallel to the plane of web 24c and on which the magnet 24e lies, as illustrated. When activated, each coil 26 generates an axially-directed magnetic field, as indicated in the drawing by the arrows marked 26m. However, unlike the prior art, in which coils of an LSM guideway are oriented so that their respective axially-directed magnetic fields 26m are normal to the plane p defined by the running surfaces, in the illustrated embodiment, the coils 26 are oriented so that their axially-directed fields 26m fall in planes that are parallel to the plane p (while still being normal to the plane m). In addition, in the illustrated embodiment, the respective common axes of the plurality of coils 26 in each region (i.e., each straightaway, curve, etc.) defined by the module 22a (or in which the module forms a part) are substantially aligned with one another. In straight-away regions, "aligned" means linearly aligned or, expressed another way, in such regions, the fields 26m are normal to the direction of motion in which vehicles are propelled in those regions. Whereas, in curved regions, "aligned" means radially aligned and, too, in such regions, the fields 26m are normal to the direction of motion in which vehicles are propelled in those regions.

This is further illustrated in FIG. 5, which shows a left-right diverge module 22g and its constituent coils 26 and running surfaces 28a (further running surfaces 28b, if any, incorporated into the module are not shown). As indicated by lines 28m on the drawing:

the respective common axes 22m-a of the plurality of coils 26 in the straight-ahead region 22g-a of the merge/diverge module are substantially aligned with one another and normal to the axis of motion x-a of vehicles (not shown) in that region;

the respective common axes 22m-b of the plurality of coils 26 in the curve region 22g-b of the merge/diverge module are substantially aligned with one another, albeit radially, and normal to the curved "axis" of motion x-b of vehicles (not shown) in that region.

Although FIG. 5 illustrates a left-right merge/diverge module that directs a vehicle 24 in a horizontal plane of motion, the teachings hereof are equally applicable to up-down merge/diverge modules in vertical planes of motion and/or other corresponding modules for directing vehicles in other respective planes of motion, and so forth. And, as noted above, although some guideways according to the invention can include merge/diverge modules that direct vehicles in a single, common plane of motion (e.g., horizontal or vertical or so forth), other guideways according to the invention include merge/diverge modules that direct vehicles in multiple respective planes of motion—e.g., one or more modules for horizontal planes of motion, one or more modules for vertical planes of motion, and so forth).

In addition to the foregoing, the diverge module 22g can include a flipper, moving rails and/or other switching mechanism to facilitate redirection of a vehicle passing thereon. In this regard, reference is had to the switching mechanisms disclosed in incorporated-by-reference International Application Publication No. WO2014047104 and U.S. Patent Publication 2013/0074724 including, by way of non-limiting example, in FIGS. 20A-20B, 22A-22B, 24A-24B, and the accompanying text, of those publications—all as adapted in accord with the teachings hereof.

The diverge module 22g can, moreover, be constructed and operated in the manner of a diverge section of the type disclosed in those incorporated-by-reference applications including, by way of non-limiting example, in the 18, FIGS. 20A through 26B and the accompanying text of those publications—again, as adapted in accord with the teachings hereof.

Described herein are systems and methods meeting the objects set forth above. It will be appreciated that the embodiments shown in the drawings and discussed in the accompanying text are merely examples of the invention and that other embodiments, incorporating modifications to that shown here, fall within the scope of the invention. Thus, by way of example, whereas some regions, sections, modules and/or the like of the guideway discussed above and shown in the drawings are occasionally referred to as "diverge" regions, sections, modules, and/or the like, respectively, such references are shorthands for and refer to (throughout this specification and the attached claims) what are more commonly known as "merge/diverge" regions, sections, modules, and/or the like respectively. And, by way of further example, whereas curve, merge/diverge, straightaway and/or other regions, sections, modules and/or the like are referred to herein as lying in horizontal or vertical planes of motion, it will be appreciated that they may lie in planes of motion having other orientations instead or in addition.

In view of the foregoing, what we claim is:

1. A transport system comprising:
   a linear synchronous motor guideway in or on which one or more vehicles are propelled, where each such vehicle includes magnets;
   wherein the guideway comprises one or more modules, each module comprising a plurality of propulsion coils, and
   wherein each of the propulsion coils in a region of the guideway comprises turns that are disposed about a common axis, such that the respective common axes of the plurality of propulsion coils in the region are substantially aligned with one another, and orthogonal to a direction in which the vehicles are to be propelled in the region; and wherein the plurality of propulsion coils of the region are disposed on two opposing sides of and in laterally facing relation to the magnets of the vehicles propelled on the region, and the propulsion coils exert a propulsive force of substance on the magnets of the vehicles.

2. The system of claim 1, wherein the modules include any of straight sections, curved sections, and inclined sections.

3. The system of claim 1, wherein the region is curved and the respective common axes of the plurality of propulsion coils in the region are radially aligned with one another.

4. The system of claim 1, wherein the region is straight and the respective common axes of the plurality of propulsion coils in the region are linearly aligned with one another.

5. The system of claim 1, wherein the guideway is arranged to propel vehicles along one or more directions, including a horizontal direction and a non-horizontal direction.

6. The system of claim 5, wherein the non-horizontal direction comprises a vertical direction.

7. The system of claim 6, wherein the guideway is arranged to propel the vehicles at two or more heights.

8. The system of claim 7, wherein the two or more heights include a floor height, a tabletop height, and an overhead height.

9. The system of claim 1, comprising another region in which a second plurality of propulsion coils are disposed on a single side of and in laterally facing relation to magnets of the vehicles, and the second plurality of propulsion coils exert a propulsive force of substance on the magnets of the vehicles.

10. The system of claim 1, wherein the vehicles have a generally I-shaped cross section.

11. The system of claim 1, wherein the vehicles are generally planar.

12. The system of claim 1, wherein the vehicles have magnets on two mutually opposite sides.

13. A transport system comprising:
a linear motor guideway having a region in which a vehicle is propelled, the region including a plurality of propulsion coils, and the vehicle including magnets, each of the propulsion coils in the region of the guideway comprising a plurality of turns that are disposed about a common axis, the respective common axes of the plurality of propulsion coils in the region being substantially aligned with one another, and orthogonal to a direction in which the vehicle is to be propelled;
wherein the plurality of propulsion coils of the region are disposed on two opposing sides of and in laterally facing relation to the magnets of the vehicles propelled on the region, and the propulsion coils exert a propulsive force of substance on the magnets of the vehicles.

14. The system of claim 13, wherein the vehicles have a generally I-shaped cross section.

15. The system of claim 13, wherein the vehicles are generally planar.

16. The system of claim 13, wherein the vehicles have magnets on two mutually opposite sides.

17. A transport system comprising:
a linear motor guideway having a plurality of propulsion coils for propelling a vehicle including magnets, each of the propulsion coils comprising a plurality of turns that are disposed about a common axis, the respective common axes of the plurality of propulsion coils being substantially aligned with one another, and orthogonal to a direction in which the vehicle is to be propelled;
wherein the plurality of coils are disposed on two opposing sides of and in laterally facing relation to the magnets of the vehicle, and the propulsion coils exert a propulsive force of substance on the magnets of the vehicle.

18. The system of claim 17, wherein the vehicles have a generally I-shaped cross section.

19. The system of claim 17, wherein the vehicles have magnets on two mutually opposite sides.

* * * * *